United States Patent [19]
Willett

[11] 3,798,568
[45] Mar. 19, 1974

[54] ATMOSPHERIC PRESSURE INDUCTION PLASMA LASER SOURCE

[75] Inventor: Colin S. Willett, Keedysville, Md.

[73] Assignee: The United States of America as represented by the Secretary of the Army, Washington, D.C.

[22] Filed: July 31, 1972

[21] Appl. No.: 276,544

[52] U.S. Cl. .............................................. 331/94.5
[51] Int. Cl. ............................................... H01s 3/02
[58] Field of Search..................... 331/94.5; 330/4.3

[56] References Cited
UNITED STATES PATENTS

| | | | |
|---|---|---|---|
| 3,516,012 | 6/1970 | Huchital | 331/94.5 |
| 3,614,657 | 10/1971 | Hattori | 331/94.5 |
| 3,628,181 | 12/1971 | Maitland | 331/94.5 |
| 3,688,215 | 8/1972 | Spencer et al. | 331/94.5 |

*Primary Examiner*—William L. Sikes
*Attorney, Agent, or Firm*—Edward J. Kelly; Herbert Berl; Saul Elbaum

[57] ABSTRACT

An atmospheric pressure induction plasma laser source which enables high power, large diameter laser systems to be operated at atmospheric pressures in materials having high melting points and which can be selectively excited in charge transfer or Penning reactions. The disclosed apparatus provides a non-molecular laser that is operable at atmospheric pressure in a structure open to the atmospheric or in a circulatory system. It also will enable laser oscillation to be realized in elements and compounds that have heretofore been unable to lase due to their difficulty in vaporizing at reasonable temperatures.

4 Claims, 2 Drawing Figures

PATENTED MAR 19 1974　　3,798,568

ATMOSPHERIC PRESSURE INDUCTION PLASMA LASER SOURCE

RIGHTS OF GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to lasers, and more particularly, to non-molecular lasers which are operable at atmospheric pressures.

2. Description of the Prior Art

Present ion lasers operating in the visible and near ultraviolet regions of the spectrum require vacuum systems and vacuum processed discharge tubes and electrodes while operating at low pressures. In addition, various deficiencies continue to exist when it comes to providing a sufficient and accurately controllable density of gas vapor lasing material required for a laser medium. One practice thus far has been to use an externally heated reservoir of metal maintained at a high temperature to provide the metal vapor atoms which are allowed to diffuse into the main plasma section of the laser. See, for example, "The Commercial Helium-Cadmium Laser," J. D. Tompkins, *Laser Focus*, August, 1969, pages 32-35. Such devices are very slow to operate because of the time required to raise the reservoir of metal up to the necessary temperature. Another solution is suggested in my earlier U.S. Pat. No. 3,621,460 in which a sputtered vapor laser is disclosed which features two discharges within a single lasing apparatus. However, the excitation necessary for my foregoing system operates only in partial vacuum and is therefore subject to the infirmities and limitations inherent in requiring vacuum systems for proper operation.

Therefore it is one object of the present invention to provide a non-molecular laser that is operable at atmospheric pressure in a structure open to the atmosphere or in a circulatory system.

Another object of the present invention is to provide an atmospheric pressure induction plasma laser that enables laser oscillation to be realized in elements and compounds that normally show a high resistance to vaporization at normal temperatures.

A further object of the present invention is to provide an induction plasma source for an atmospheric pressure laser.

A still further object of the present invention is to provide an induction plasma source for an atmospheric pressure laser in which selective excitation of upper laser levels is achieved via either charge transfer or Penning reactions.

SUMMARY OF THE INVENTION

Briefly, in accordance with the invention, laser apparatus is provided which comprises a laser tube that defines an atmospheric pressure resonant cavity, a laser medium, and an induction plasma source for pumping the laser medium to achieve a population inversion sufficient to sustain laser oscillation within said plasma tube. The induction plasma source comprises an arc-forming region into which an arc-forming gas is directed and an induction coil that surrounds the arc-forming region. The induction coil is energized by high frequency electrical energy to produce an inductive field in the arc region whereby an induced plasma arc is formed therein. The laser medium in either a liquid, gaseous or solid form, is introduced into the arc-forming region and laser excitation is achieved via either charge transfer or Penning reactions.

BRIEF DESCRIPTION OF THE DRAWINGS

The specific nature of the invention as well as other objects, aspects, uses and advantages thereof will clearly appear from the following description and from the accompanying drawing, in which.

DESCRIPTION OF THE PREFERRED EMBODIMENTS

Figure 1:
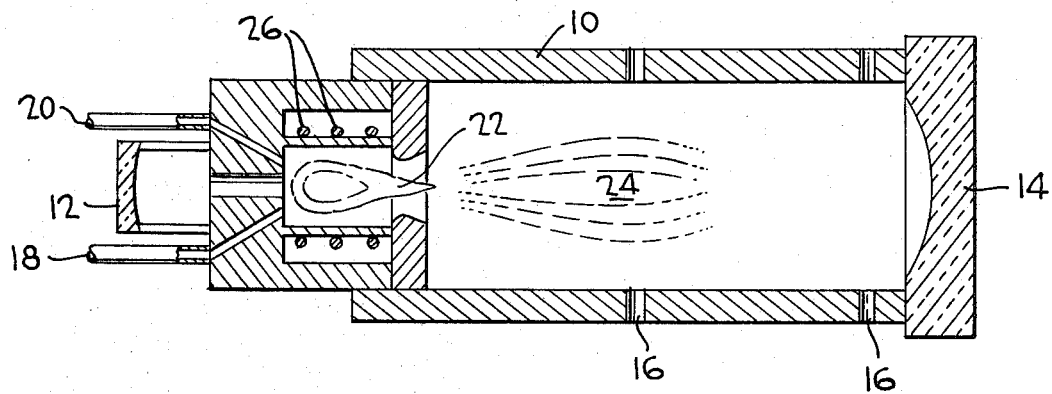
FIG. 1 is a schematic side view of laser apparatus in a preferred embodiment of the present invention.

The basic configuration of my induction plasma excitation system is shown in FIG. 1 in which the wall 10 of the laser has a plurality of openings 16 located therein to provide communication between the inner region of wall 10 and the outer atmosphere. Located at either end of the laser are a pair of optically facing dielectrically coated reflectors 12 and 14 having a high reflectivity at the desired operating wavelength. The axially propagated radiation at the desired wavelength will be reflected between reflectors 12 and 14 a sufficient number of times to sustain laser oscillation. Some degree of transmission is provided at the operating wavelength through at least one reflector to provide an output beam. Alternatively, Brewster's windows could be provided at either end of the laser to provide maximum transmission to externally placed reflectors. Inlet passage 18 leads to arc-forming region 22 and conducts a continuous flow of an arc-forming gas, such as helium, neon, argon and/or molecular gases to the arc-forming region 22. Surrounding arc-forming region 22 is a water-cooled high frequency induction coil 26. A second inlet passage 20 is provided which also leads to arc-forming region 22. It is through this second inlet passage 20 that the lasing medium is introduced into the induction plasma arc that is established in arc-forming region 22. The operation of an induction plasma of the kind utilized in the laser apparatus described herein is well known in the art in the fields of photo-chemical processing, spectroscopy, ultraviolet and thermal sterilization, and film processing. The operation of the plasma source is as follows: an ignition system (not shown) produces a conductive load (arc) within the inductive field established in arc-forming region 22. This field couples to the conductive arc gas admitted through inlet passage 18, similar to the process involved in induction heating. There then occurs a transfer of power from coil 26 to the high frequency arc, the arc acting as a single turn loop of conductive material. Circulating high frequency currents are set up within the arc gas, which raise its temperature by $I^2R$ heating, and the arc becomes a radiating mass suspended in the gas stream. Coil 26, the insulated body 10 of the light source and the high frequency power leads (not shown) should all be water-cooled for more efficient operation. An advantage of such plasma sources is the elimination of electrodes, since the high frequency energy is coupled to the arc by means of an induction coil. Inasmuch as an arc formed in region 22 will be entirely suspended in the gas stream out of contact of any solid part, there can be no contamination of the plasma. Plasma sources such as the foregoing have been developed which take close to a megawatt of input power; thus, even with a reasonable conversion, high laser output powers will be realizable.

In the operation of the device of the present invention, elements which have a low vapor pressure at normal temperatures are introduced into arc-forming region 22 via inlet passage 20 in either a liquid, solid, gaseous or vapor form. Selective excitation of the upper laser level can occur via either charge transfer or Penning reactions. Typical of such charge transfer reactions is the following example of a helium-cadmium mixture where the following reactions occur:

$$He(0) + e^- \rightarrow He^+(0) + 2e^-$$
$$He^+(0) + Cd(0) \rightarrow He(0) + Cd^{+\prime} + e^-$$

wherein $Cd^{+\prime}$ represents the excited ionized upper laser level of cadmium. In the device of the present invention the extensive ionization occurring in arc-forming region 22 is available for use in selective excitation of the upper laser levels involved. Penning reactions involve creation of a metastable state of the carrier gas and may occur simultaneously with the aforedescribed charge transfer reactions. An example of a Penning reaction which may occur in a helium-cadmium system would be characterized by the following reactions:

$$He(0) + e^- \rightarrow He^* + e^-$$
$$He^* + Cd(0) \rightarrow He(0) + Cd^{+\prime} + e^-$$

where $He^*$ represents the metastable excited state of helium and $Cd^{+\prime}$ are the excited positive ions of cadmium. The singly ionized ground state ions or metastables exist in large concentrations in inductive plasma sources. Examples of materials which can serve as laser media through inlet 20 with helium as the arc-forming gas introduced at inlet 18 are: zinc, cadmium, tin, silver, and other similar elements capable of selective excitation in charge transfer reactions with $He^+$ or $He_2^+$ ions, or in excitation transfer with He metastables. Additional examples of materials for use as laser media through inlet 20 with neon being the arc-forming gas introduced through inlet 18 are as follows: copper, gold, aluminum and any other elements found to be selectively excited by $Ne^+$ or $Ne_2^+$ ions, or in excitation transfer with Ne metastables. The device should also be operable with mixtures of atomic or molecular gases and vapors where energy transfer can produce selective excitation of upper laser levels, such as $N_2O$, $NO_2$, $SO_2$, $C_2H_2$, etc. with helium or neon. Such metastables and ions have long lifetimes even in high pressure gases and have large diffusion path lengths so that active volumes can be large and can extend through plasma region 24. The foregoing selective excitation reactions have the biggest cross-sections for energy transfer in atomic species so far reported, thus leading to extremely efficient laser systems. Normal DC-excited gas lasers require small diameter systems to produce high concentrations of excited species; however, in this invention, wall effects are not important since large diameter laser structures are realizable with a high power output that follows from the use of a large volume of active medium.

The adverse operation at high current densities caused by cataphoretic effects which occur in existing metal vapor lasers are avoided in the apparatus of the present invention.

Figure 2:
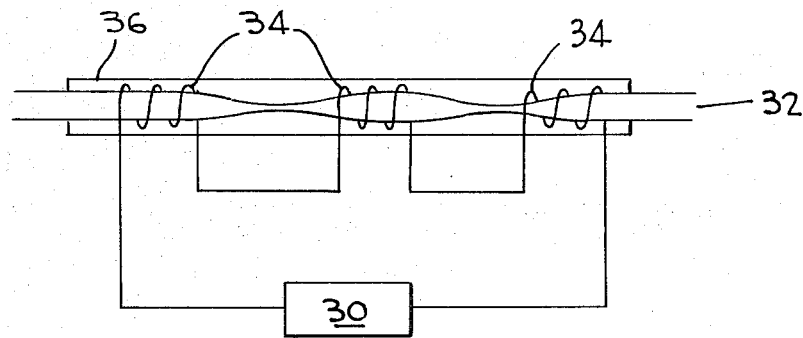
FIG. 2 is a schematic illustration of another embodiment utilizing the concepts of the present invention.

FIG. 2 illustrates a configuration in which several induction coils 34 can be placed around a plasma tube 32 to produce a long active region by having the plasma sources operating in tandem. The induction coils 34 are energized by a high frequency generator 30. Enclosure 36 represents water-cooling means and auxiliary apparatus. Additionally, it should be obvious that operation of a series of plasma sources is possible such that the resonant cavity of the laser can be made to be transverse to the plasma, thus enabling certain regions of the plasma which exhibit the highest population inversion to be selectively excited.

It is thus seen by virtue of the foregoing that I have provided a non-molecular laser that is operable at atmospheric pressure in a structure open to the atmosphere. The device of the present invention, by utilizing an induction plasma source, enables laser oscillation to be realized in elements and compounds that have so far not lased due to vaporization difficulties at reasonable temperatures. It is also possible that if materials such as powders and liquids are allowed to enter the high radiation field produced in region 24 of the resonant cavity of the laser, scattering and absorption of radiation will occur. Subsequent re-emission of the radiation (Raman effect) can be utilized as a tool for spectrochemical analysis of the material injected into the laser cavity. This invention also enables a vapor laser to be operated without an externally heated reservoir and without the requirement for a vacuum system. The nature of the plasma source obviates the need for a warmup time. By controlling the gas feeds and high frequency current to the plasma induction coils it is possible to accurately control the conditions of the laser medium.

I wish it to be understood that I do not desire to be limited to the exact details of construction shown and described, for obvious modifications will occur to a person skilled in the art.

I claim as my invention:

1. An atmospheric-pressure induction plasma laser, which comprises:

a laser plasma tube defining a resonant cavity for sustaining laser oscillation, said tube having openings therein to communicate said cavity with the surrounding atmospheric pressure;

an induction plasma excitation source located at one end of said plasma tube and comprising an arc-forming region into which an arc-forming gas is directed and an induction coil that surrounds said arc-forming region;

high frequency electrical energization means for energizing said coil to produce an inductive field in said arc-forming region whereby an induced plasma arc is formed in said arc-forming region; and means for introducing a laser medium into said arc-forming region of said induction plasma source whereby said induction plasma source pumps said laser medium to achieve a high population of excited upper laser level species within said plasma tube.

2. The apparatus of claim 1 wherein said induction coil is provided with water cooling means.

3. The atmospheric-pressure induction plasma laser of claim 1 wherein said induction plasma source pumps said laser medium by means of charge-transfer collisions.

4. The atmospheric-pressure induction plasma laser of claim 1 wherein said induction plasma source pumps said laser medium by means of Penning reactions.

* * * * *